(12) United States Patent
Gruber et al.

(10) Patent No.: US 6,811,730 B2
(45) Date of Patent: Nov. 2, 2004

(54) INJECTION MOULDING PROCESS

(75) Inventors: Herbert Gruber, Pergarten (AT); Johann Voggeneder, Mauthausen (AT); Manfred Kapfer, Ried in der Riedmark (AT)

(73) Assignee: Engel Maschinenbau Gesellschaft m.b.H., Schwertberg (AT)

( * ) Notice: Subject to any disclaimer, the term of this patent is extended or adjusted under 35 U.S.C. 154(b) by 245 days.

(21) Appl. No.: 09/992,701

(22) Filed: Nov. 14, 2001

(65) Prior Publication Data
US 2002/0056935 A1 May 16, 2002

(30) Foreign Application Priority Data
Nov. 15, 2000 (AT) .................................. A 1924/2000

(51) Int. Cl.$^7$ .................................................. B29C 44/02
(52) U.S. Cl. ...................................... 264/51; 264/40.5
(58) Field of Search .......................... 264/40.5, 50, 51, 264/53

(56) References Cited

U.S. PATENT DOCUMENTS

| | | | |
|---|---|---|---|
| 3,078,515 A | 2/1963 | Wintriss | |
| 3,728,057 A | 4/1973 | Grundman et al. | |
| 6,005,013 A | * 12/1999 | Suh et al. | ...................... 521/79 |
| 6,062,843 A | 5/2000 | Yamaura | |
| 6,322,347 B1 | * 11/2001 | Xu | ........................... 425/376.1 |
| 6,328,916 B1 | * 12/2001 | Nishikawa et al. | ........... 264/53 |

FOREIGN PATENT DOCUMENTS

WO  WO98/31521  * 7/1998

* cited by examiner

Primary Examiner—Allan R. Kuhns
(74) Attorney, Agent, or Firm—Notaro & Michalos P.C.

(57) ABSTRACT

An injection assembly for an injection moulding machine, comprising a screw (2) mounted in a plasticising cylinder and an injection piston (8) which moves the screw (2) in the longitudinal direction and which is mounted in an injection cylinder, wherein there is provided a supply conduit for the injection cylinder having a control valve (13) which can be shut off and there is provided an additional conduit (14) which by-passes the control valve (13) and in which are arranged a device (17) for reducing the amount of the pressure fluid flowing to the injection cylinder (7) and possibly a device (16) for reducing the pressure.

4 Claims, 2 Drawing Sheets

INJECTION MOULDING PROCESS

DESCRIPTION

Field and Background of the Invention

The present invention concerns an injection moulding process for the injection into a mould of a single-phase solution of polymer and propellant which is prepared in a plasticising cylinder of an injection moulding machine.

The present invention is closely related to the so-called MuCell process. The aim of that process is to produce light plastic components with homogenously distributed small gas bubbles (cells). That is achieved by a procedure whereby, in preparation of the material to be injected, the propellant, for example $N_2$ or $CO_2$, is added in a supercritical state. For that purpose, a high pressure is produced in the plasticising cylinder so that the polymer and the propellant form a single-phase solution. Due to the rapid drop in pressure in the procedure of filling the tool, the propellant as gas foams up the plastic material and produces a microcellular foam.

Problems arise in connection with that process if the person operating the injection moulding machine has to open a guard or protective device, for example a guard grid. That can be necessary in order to remove a sprue or to take out parts. For safety reasons it was hitherto the usual practice when opening a guard device to shut off the feed flow of pressure fluid to the injection cylinder. In the MuCell process however the result of this was that the mass pressure in the plasticising cylinder falls below that limit value as from which the single-phase solution breaks down and becomes unusable. Foaming in the plasticising cylinder however is undesired and makes the material prepared unusable.

SUMMARY OF THE INVENTION

Therefore the object of the present invention is to provide a process and an apparatus with which separation of the propellant in the plasticising cylinder is avoided, while maintaining high safety standards.

With the process according to the invention that object is attained in that upon opening of a guard device of the injection moulding machine by the person operating the machine the connection between the plasticising cylinder and the mould is interrupted and the maximum speed of displacement of the screw arranged in the plasticising cylinder is limited.

When the prescribed interruption in the connection between the plasticising cylinder and the mould comes about the screw does not move at all after opening of the guard device and the possibility which is provided in accordance with the invention involving a movement at a really low speed only results in maintenance of that pressure which is necessary to obtain a single-phase condition of the polymer and the propellant gas. So that the safety aspect has priority at any event, it is provided that the maximum speed of the screw is reduced to zero if an end position monitoring means does not signal the interruption in the connection between the plasticising cylinder and the mould.

The structural implementation of the invention is at its simplest if it can be assumed that the pressure can be maintained even when the screw is stationary. That is the case when, with a hydraulic machine, the regulating valve which is switched off upon opening of the guard device affords complete sealing integrity and thus can hold the applied pressure—if need be together with a check valve. In order to have a control over the applied pressure however, in general terms in a hydraulic machine in which there is a supply conduit with a control valve, which can be shut off, for the injection cylinder, there is provided an additional conduit which by-passes the control valve and in which are arranged a device for reducing the amount of the pressure fluid flowing to the injection cylinder and possibly a device for reducing the pressure.

In a departure from the existing standard (EN 201/1997), the arrangement does not involve the feed flow to the injection cylinder being shut off. Merely reducing the hydraulic pressure however would not be sufficient to exclude the person operating the injection moulding machine being put at risk. It is only a reduction in the amount of pressure fluid flowing to the injection cylinder that provides that, even in the case of the prepared material issuing from the plasticising cylinder, due to a fault, there is no hazard involved, as the issue of the material rakes place only extremely slowly, by virtue of the reduced amount of pressure fluid.

Basically, it would be possible to implement the reduction in the amount and possibly the pressure of the pressure fluid which flows to the injection cylinder, by adjustment of the supply pump. As however the supply pump does not supply exclusively the injection cylinder, a drop in the pressure and the amount in respect of the pressure fluid for the entire system is undesirable. The additional conduit according to the invention, which by-passes the closable control valve, with a device for reducing the amount of the pressure fluid flowing to the injection cylinder, permits an influence to be exerted on the amount and the pressure, such influence being limited to the injection cylinder. The other regions of the injection moulding machine remain uninfluenced.

In the optimum situation the pressure or the pressure fluid flowing to the injection cylinder is reduced to such a degree that the pressure level in the plasticising cylinder is just sufficient to keep the single-phase solution of polymer and propellant gas prepared therein, in the single-phase condition.

The invention is not limited to use in relation to hydraulic machines. In the case of electrically driven machines, the limitation on the maximum speed of displacement of the screw can also be achieved by monitoring the speed of rotation of the driving servo motor. The applied pressure results from the torque which is produced by the motor and which substantially depends on the current strength obtaining in the motor.

The safety aspect is increased if a drive for the screw is maintained only when an end position switch signals the closed condition of a closure nozzle which closes off the plasticising cylinder.

In structural terms, in the case of hydraulic machines, that is achieved in that a control valve which can be shut off is provided in the additional conduit and that the plasticising cylinder is provided with a preferably hydraulically actuated closure nozzle with at least one end position switch, the control valve which is arranged in the additional conduit being controllable by means of a control system in dependence on the signals from the end position switch.

Further features and details of the present invention will be apparent from the description hereinafter of the drawing in which the apparatus according to the invention is shown in respective diagrammatic views of a hydraulically and an electrically driven machine.

DESCRIPTION OF THE PREFERRED EMBODIMENT

Figure 1:
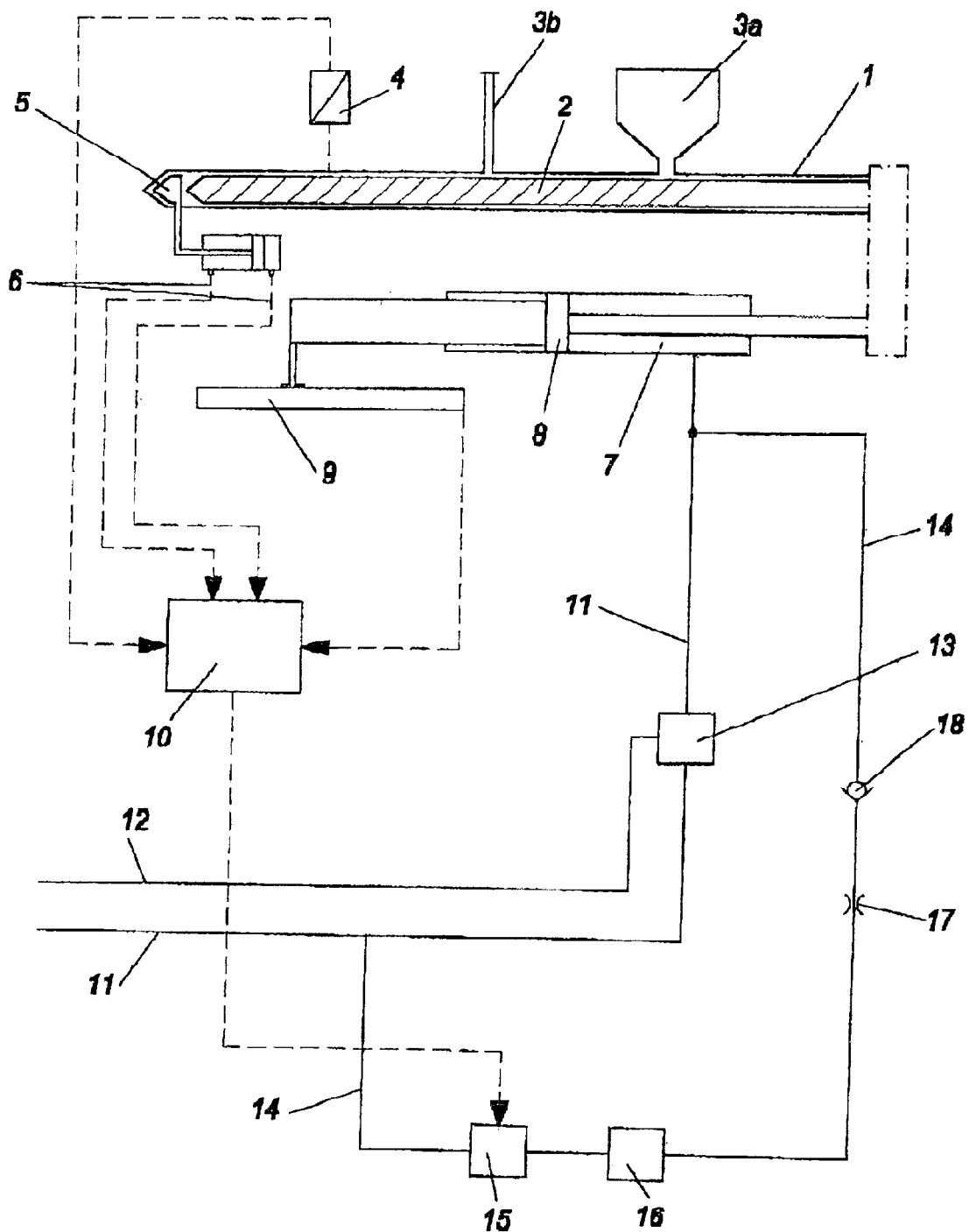
FIG. 1 is a diagrammatic view of an embodiment of the invention.

The injection assembly shown in FIG. 1 comprises a plasticising cylinder 1 in which a screw 2 is rotatably and longitudinally slidably mounted. Plastic material and propellant in a liquid condition are fed to the plasticising cylinder 1 by way of the hopper 3a and the conduit 3b. Arranged in the front region of the plasticising cylinder 1 is at least one pressure sensor 4 for monitoring the pressure in the plasticising cylinder 1. This pressure monitoring action is important as that mass pressure which ensures that the propellant remains in solution with the polymer must be maintained in the plasticising cylinder 1 over the entire cycle.

Signals from the pressure sensor 4 are passed to a control system 10. The control system 10 also receives the signals from two end position switches 6 which are arranged on the hydraulic cylinder for the closure nozzle 5 of the plasticising cylinder 1. The control system 10 has a further input from the travel measuring system 9 which monitors the position of the injection piston 8 in the injection cylinder 7.

In the normal condition the injection cylinder 7 is supplied with pressure fluid by way of the supply conduit 11. Arranged in the supply conduit 11 is a control valve 13 which can be shut off and which also permits the return flow of pressure fluid by way of the return flow conduit 12.

If now a guard grid of the injection moulding machine is opened, the direct feed flow of hydraulic fluid to the injection cylinder 7 by way of the supply conduit 11 is interrupted by the control valve 13 being shut off. The emergency supply with which outgassing of the propellant in the plasticising cylinder 1 is avoided is effected by way of the additional conduit 14. The closed control valve 13 is by-passed with the additional conduit 14. The additional conduit 14 can branch off the supply conduit 11 upstream of the control valve 13 or can be taken directly to the supply pump (not shown).

It is essential that arranged in the additional conduit 14 is a pressure-reducing valve 16 and a throttle 17 for reducing the quantitative through-flow. Also provided in the additional conduit 14 is a check valve 18 and a control valve 15 which can be shut off. The control valve 15 serves on the one hand to prevent an unwanted secondary flow by way of the additional conduit 14 when the control valve 13 in the supply conduit 11 is open. On the other hand the control valve 15 in the additional conduit 14 permits an emergency supply to the injection cylinder 7 only when it receives from the control system 10 the message that the closure nozzle 5 of the plasticising cylinder 1 is in the end position "closed".

The hydraulic pressure obtaining in the supply conduit 11 is reduced by the pressure-reducing valve 16 to such a degree that the mass pressure resulting therefrom in the plasticising cylinder 1 is just sufficient to prevent outgassing of the propellant. During the injection procedure that means for example that the mass pressure in the plasticising cylinder 1 is lowered from about 1500 bars to between 100 and 300 bars. A still greater reduction is effected by way of the throttle 17, in regard to the amount of pressure fluid. The amount of pressure fluid is lowered to less than $\frac{1}{10}$ and preferably even to less than $\frac{1}{20}$ of the usual standard maximum amount upon injection. The required high safety standards are maintained by virtue of that drastic reduction in the amount of pressure fluid.

Figure 2:
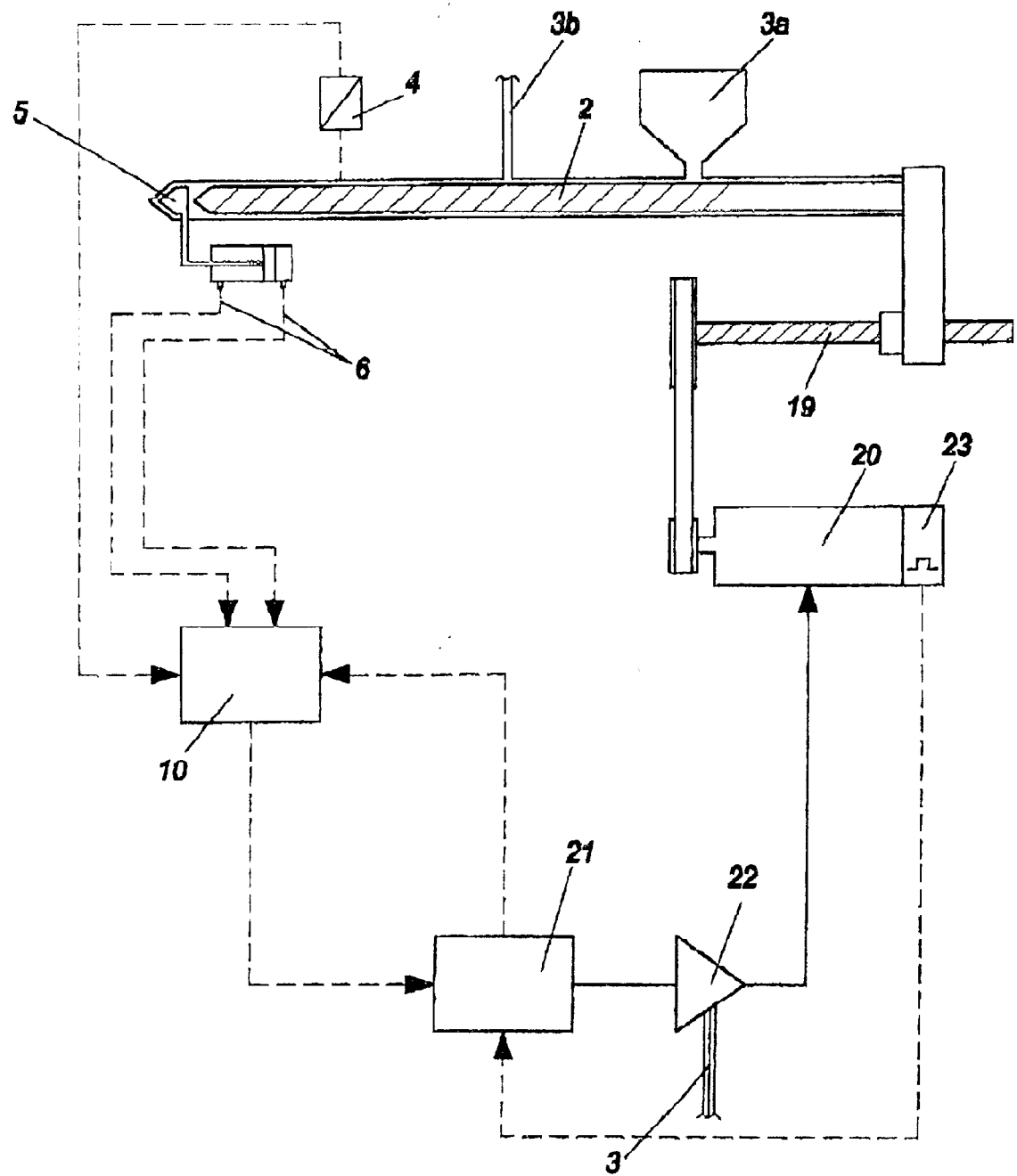
FIG. 2 is a view similar to FIG. 1 of another embodiment of the invention.

In the embodiment shown in FIG. 2 the axial movement of the screw 2 is effected by means of a spindle 19 driven by an electric motor 20. The regulator 21 acts on the motor 20 on the one hand by way of the power member 22 and on the other hand by way of the motor control 23. The regulation is to be such that, when the guard grid is opened, that does not automatically cause the motor 20 to be completely switched off. On the contrary the motor maintains the torque necessary to maintain the aggregate state of the material being metered. It will be appreciated that a condition for that to happen is that the closure nozzle 5 is properly closed and thus maintenance of the necessary pressure is possible when the screw 2 is stationary or upon at most slight forward movement thereof.

What is claimed is:

1. An injection moulding process for the injection into a mould of a single-phase solution of polymer and propellant which is prepared in a plasticising cylinder of an injection moulding machine, characterised in that upon opening of a guard device of the injection moulding machine by the person operating the machine the connection between the plasticising cylinder and the mould is interrupted and the maximum speed of displacement of the screw arranged in the plasticising cylinder is limited in a way that the force acting on the screw is reduced to such a degree that the pressure level in the plasticising cylinder is just sufficient to keep the single-phase solution of polymer and propellant gas prepared therein in the single-phase condition.

2. An injection moulding process according to claim 1 characterised in that a mass pressure of between about 100 and 300 bars is maintained in the plasticising cylinder.

3. An injection moulding process according to claim 1 characterised in that the speed of the screw is reduced to less than $\frac{1}{10}$ of a maximum speed in the injection operation.

4. An injection moulding process according to claim 1 characterised in that the maximum speed of the screw is reduced to zero if an end position monitoring means does not signal the interruption in the connection between the plasticising cylinder and the mould.

\* \* \* \* \*